United States Patent
James

(10) Patent No.: US 10,139,650 B2
(45) Date of Patent: Nov. 27, 2018

(54) ONE PIECE EYEWEAR WITH CONCEALED HINGES

(71) Applicant: Timothy James, Brooklyn, NY (US)

(72) Inventor: Timothy James, Brooklyn, NY (US)

(*) Notice: Subject to any disclaimer, the term of this patent is extended or adjusted under 35 U.S.C. 154(b) by 3 days.

(21) Appl. No.: 14/800,634

(22) Filed: Jul. 15, 2015

(65) Prior Publication Data
US 2017/0017094 A1    Jan. 19, 2017

(51) Int. Cl.
| G02C 5/14 | (2006.01) |
| G02C 5/22 | (2006.01) |
| G05B 19/4099 | (2006.01) |
| G06Q 30/06 | (2012.01) |
| B29C 64/386 | (2017.01) |
| B33Y 50/02 | (2015.01) |
| B29L 12/00 | (2006.01) |

(52) U.S. Cl.
CPC .......... *G02C 5/2209* (2013.01); *B29C 64/386* (2017.08); *G02C 5/2254* (2013.01); *G02C 5/2272* (2013.01); *G05B 19/4099* (2013.01); *G06Q 30/0621* (2013.01); *B29L 2012/005* (2013.01); *B33Y 50/02* (2014.12); *G02C 2200/22* (2013.01); *G05B 2219/35134* (2013.01); *G05B 2219/49007* (2013.01)

(58) Field of Classification Search
CPC ... G02C 5/14; G02C 5/16; G02C 5/18; G02C 5/22; G02C 5/2254; G02C 5/2218; G02C 5/2272
USPC ......... 351/121, 41, 63, 83, 87, 89, 111, 113, 351/115, 118, 114, 158, 178
See application file for complete search history.

(56) References Cited

U.S. PATENT DOCUMENTS

| 3,526,449 | A |   | 9/1970 | Bolle et al. |   |
| 4,917,479 | A | * | 4/1990 | Bidgood | G02C 5/143 |
|   |   |   |   |   | 351/118 |
| 5,059,017 | A |   | 10/1991 | Bennato |   |
| 5,518,680 | A |   | 5/1996 | Cima et al. |   |
| 6,139,143 | A | * | 10/2000 | Brune | G02C 3/003 |
|   |   |   |   |   | 16/228 |
| 7,080,904 | B2 | * | 7/2006 | Jobin | G02C 5/008 |
|   |   |   |   |   | 16/228 |
| 7,722,188 | B2 | * | 5/2010 | Mikame | G02C 3/003 |
|   |   |   |   |   | 16/228 |
| 2014/0185002 | A1 |   | 7/2014 | McNeal |   |
| 2014/0253863 | A1 | * | 9/2014 | Iimura | G02C 1/00 |
|   |   |   |   |   | 351/83 |

(Continued)

*Primary Examiner* — Stephone B Allen
*Assistant Examiner* — Travis Fissel
(74) *Attorney, Agent, or Firm* — Bodner & O'Rourke, LLP; Gerald T. Bodner; Christian P. Bodner

(57) ABSTRACT

The present invention generally concerns a one piece eyewear having concealed hinges made via 3D printing. More specifically, the invention includes a U-shaped hinge with irregular offsets that are blended parametric curves that connect a lens frame to temple bars. The hinge is most flexible at its parabolic cross section and allows the temple bars to open and close, mimicking the rotational and stress bearing properties of traditional mechanical hinges. The eyewear is sculpted in a 3D modeling program that exports digital instructions for rendering the hinges, lens frame, and temple bars as a single construct by a 3D printer. The one piece eyewear is capable of accepting prescription or non-prescription lenses. A method for making the eyewear having concealed hinges is also disclosed.

15 Claims, 7 Drawing Sheets

(56) References Cited

U.S. PATENT DOCUMENTS

| | | | |
|---|---|---|---|
| 2014/0305093 A1* | 10/2014 | Nevatia | A44C 27/00 59/35.1 |
| 2015/0039113 A1 | 2/2015 | Kanada | |
| 2015/0061166 A1* | 3/2015 | Van De Vrie | B29C 67/0059 264/1.7 |
| 2015/0097315 A1 | 4/2015 | DeSimone et al. | |

* cited by examiner

ONE PIECE EYEWEAR WITH CONCEALED HINGES

CROSS REFERENCE TO RELATED APPLICATIONS

This patent application does not claim priority to any other patent application.

FIELD OF THE INVENTION

The present invention generally concerns a one piece eyewear having concealed hinges made via 3D printing. More specifically, the invention includes a U-shaped hinge with irregular offsets that are blended parametric curves that connect a lens frame to temple bars. The hinge is most flexible at its parabolic cross section and allows the temple bars to open and close, mimicking the rotational and stress bearing properties of traditional mechanical hinges. The eyewear is sculpted in a 3D modeling program that exports digital instructions for rendering the hinges, lens frame, and temple bars as a single construct by a 3D printer. The one piece eyewear is capable of accepting prescription or non-prescription lenses. A method for making the eyewear having concealed hinges is also disclosed.

BACKGROUND OF THE INVENTION

Traditional Eyewear and Hinges

Eyewear is both functional and fashionable. Some frame designs are considered classic and timeless, such as wayfarers, the cat eye design, aviators, and the like. Eyewear designers are continuously pushing fashion boundaries to keep up with and to satisfy the public's constantly changing tastes. Whether used for prescription or for common sun filtering lenses, eyewear is traditionally made through subtractive manufacturing of left and right temple bars, hinges, and the lens frame. The cost of materials lost to the manufacturing process and bulk production is often passed on to the consumer.

Eyeglasses were initially designed to be held to the face or balanced on the nose. The addition of temple bars created a need for hinges to absorb mechanical forces like twisting, bending, and stretching that act on the frame. The traditional hinge has the inherent drawbacks of breakage at the lens frame, temple bar, or at the middle of the hinge where the screw is. Any part that is lost or broken must be replaced or the eyewear must be discarded.

Hinges connect temple bars to the lens frame on a pair of eye glasses and swivels the temple bars from the open to the closed position. Common eyewear hinges include the barrel hinge, interlocking hinges, spring hinges or breakaway hinges. FIG. 1 depicts a traditional barrel hinge 10 with two hinge parts 11$a$, 11$b$, one having an even number of evenly spaced knuckles 11$a$ and the other having an odd number of evenly spaced knuckles 11$b$. Each hinge part 11$a$, 11$b$ is perpendicularly affixed to the outer corners of the lens frame 12 and to a corresponding temple bar 13. One hinge part 11$b$ is mounted to the temple bar 13 with screws 14 and a brace 15. The other hinge part 11$a$ is mounted into the lens frame 12 with screws 14 and a brace 15. The knuckles of each part 11$a$, 11$b$ are interleaved and form a hollow cylinder that is threaded and can accept a screw 14. All hinge 10 parts are manufactured separately and assembled for use.

3D Modeling & Printing for Additive Manufacturing

The continued refining of 3D Printing has opened a world of possibilities for additive manufacturing. With digital models, 3D Printing can make cost effective three-dimensional solid objects of virtually any shape. This method of manufacturing is additive, where successive layers of a material are laid down in different shapes according to digital instructions.

3D Printing is also considered distinct from traditional machining techniques, which mostly rely on the removal of material by methods such as cutting or drilling, the subtractive processes. With additive manufacturing, objects can be used anywhere throughout the product life cycle, from pre-production (i.e. rapid prototyping) to full-scale production (i.e. rapid manufacturing), in addition to tooling applications and post-production customization. 3D printing technology is used with applications in architecture, industrial design, automotive, aerospace, military, civil engineering, medical industries, biotech, fashion, footwear, jewelry, eyewear, education, geographic information systems, and many other fields.

The present invention takes advantage of 3D printers to construct a one piece eyewear having hinges defined by parametric contours that mimic the rotational motion and force absorption properties of traditional mechanical hinges. The entire eyeglass frame is a continuous construct. The temple bars open and close at a designated point of weakness placed in the inside corner of the frame, being the flexible hinge of the present invention.

U.S. Pat. No. 3,526,449 to Bolle et al. discloses sunglasses being a one piece eyewear molded to have optically curved lenses.

U.S. Pat. No. 5,059,017 to Bennato et al. discloses a bellow like hinge having lugs that connect the lens frame to temple rods.

US Patent Application No. 2015/0039133 filed by Kanada discloses the basic concepts of 3D printing including the use of computer instructions and materials that can be used for printing constructs.

US Patent Application No. 2014/0185002 filed by McNeal discloses eyewear frames having contoured temples.

U.S. Pat. No. 5,518,680 to Cima, L. et al. discloses various 3D printing techniques, which is incorporated herein by reference.

US Patent Application No. 2015/0097315 filed by DeSimone, J. M. et al. discloses a 3D printing technique called Continuous Liquid Interface Production (CLIP), which is incorporated herein by reference.

None of the cited art discloses the advantages of making concealed hinges that are flexible parametric curves for eyewear by additive manufacturing. Therefore, there is a need for a one piece eyewear layered through 3D printing having a concealed hinge that mimics the rotational motion and stress bearing properties of traditional hinges.

SUMMARY OF THE INVENTION

These and other advantages for a creating a one piece eyewear with concealed hinges via 3D modeling and printers are provided in the present invention. One aspect of the present invention includes a one piece eyewear with a 3D printed lens frame, temple bars, and concealed hinges. The hinges are complementary top and bottom B-spline curves being blended parametric composites that are U-shaped with irregular offsets that connect the upper rear corners of the lens frame to a terminating overlap at each temple bar.

It is an aspect of the present invention wherein the lens frame, temple bars, and concealed hinges are initially modeled in a 3D modeling program as a single construct.

It is an aspect of the present invention wherein each hinge is most flexible at a parabolic cross section that allows each temple bar to open and close, mimicking the rotational, stress bearing, and force-bearing properties of traditional eyewear hinges.

It is an aspect of the present invention wherein the lens frame may accept prescription lenses, non-prescription lenses, or fashionable or sun filtering lenses, or no lenses at all.

It is an aspect of the present invention wherein the materials commonly used in 3D printing may include but are not limited to acrylonitile butadiene styrene, polylactic acid, polyvinyl alcohol, polycarbonate, polylactic acid, thermoplastic polyurethane, styrene block-copolymers, thermoplastic silicone elastomer, aliphatic or semi-aromatic polyamides, thermoplastic vulcanisate, gold, steel, stainless steel, titanium, silver, polyethylene, polypropylene or polyamide, or any combinations thereof.

Yet another aspect of the present invention includes a small gap being added where the outer portion of each temple bar meets the lens frame, where the gap is from about 0.0001 mm to about 1.0 mm when a temple bar is in the wearing position.

It is an aspect of the present invention wherein the 3D modeling program includes the ability to have free form surface manipulation and the abilities to sweep, extrude, revolve, loft, slice, sculpt, or convert connected points forming 2D parametric contours and straight lines into any imaginable 3D shape.

It is an aspect of the present invention wherein the concealed hinge's contour, over all shape, and flexibility are not dependent upon any particular style or shape lens frame or temple bars designed or selected by the user.

It is an aspect of the present invention wherein the 3D modeling program exports file formats that are digital printing instructions for 3D printers including a CLIP, SLS, Stereoliography, FMD printers, or any combinations thereof.

It is an aspect of the present invention wherein the concealed hinges are areas of weakness, each being a parabolic cross section, that allow each temple bar to pivot inwards at an angle of at least 90° relative to the back surface of the lens frame.

It is an aspect of the present invention wherein the amount of materials used at the parabolic cross section is about 0.1% to about 3% of the overall weight of the one piece eyewear.

Yet another aspect of the present invention includes a method for making a one piece eyewear with concealed hinges wherein the steps involve drawing a one piece eyewear with concealed hinges in a 3D modeling program, exporting the spatial instructions for the construct in a 3D printer file format, and a 3D printer using those spatial instructions to layer the one piece eyewear with materials commonly used in 3D printing.

It is an aspect of the present invention wherein a method for purchasing the one piece eyewear with concealed hinges includes a user logging onto a website or an in store computer based kiosk having a 3D modeling platform with a wide variety of selections of one-piece eyewear frames having concealed hinges, the user selecting from a cavalcade of eye-wear shapes, all with the unique one part concealed hinge design, and adjusting the lens frame and temple bars in terms of size and shape within predetermined parameters, the user adjusting, in real time, the frame from predetermined variables, freely moving the frame shape about within the defined parameters, e.g. adjusting the lens frame and temple bars for an optimal fit but also to style the shape and personal visual preference, the user choosing materials, color, or decal style before going on to choose the lens type, be it prescription lenses, sunglass lenses, no lenses, or the option of adding their own lenses once they've tried on the frame, the user purchasing their personally designed one piece eyewear having concealed hinges, and the instructions for the eyewear sculpted by the user in either a kiosk or across the internet via their personal computer being sent to a 3D printer to create the user's custom one piece eyewear with concealed hinges and the finished eyewear being delivered to the user's address or may be picked up from a store.

BRIEF DESCRIPTION OF THE DRAWINGS

The figures discussed below are non-limiting examples of the present invention and are intended to capture or contemplate common changes to the same.

DEFINITIONS

Figure 1:
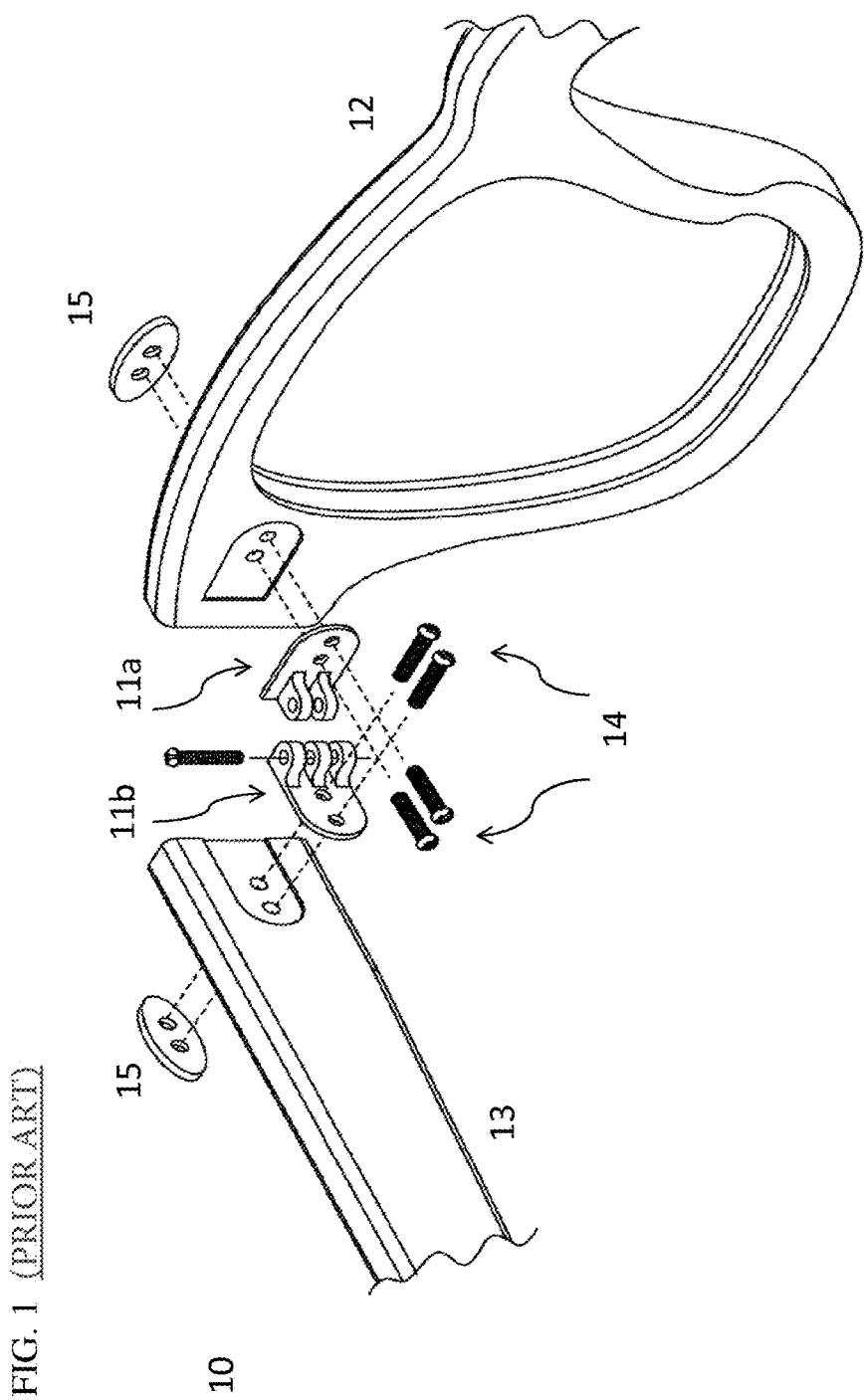
FIG. 1 is an exploded view of a traditional hinge 10 assembly for eyewear. Each hinge part 11a, 11b is perpendicularly affixed to the outer end of the lens frame 12 and to a corresponding temple bar 13 with screws 14. The knuckles of each part 11a, 11b are interleaved and form a hollow cylinder that is threaded and can accept a screw 14.

To detail the present invention, the following non-limiting terms are used:

The term "one piece eyewear" generally refers to eyewear that has been made via a 3D printer, where the lens frame and each temple bar are formed as a single construct and are connected by irregular U-shaped hinges at its offsets located at the corner where the lens frame and temple bars meet.

The term "irregular offsets" generally refers to the contoured line segments that extend from the general U shape contour of the hinge's center point, where the offsets are connected to the lens frame and the overlap of the temple bar.

The term "construct" generally refers to the finished and tangible one piece eyewear having concealed irregular U-shaped hinges formed via the successive layering process of 3D Printing.

The term "digital instructions" generally refers to the spatial points that make the one piece eyewear in a 3D modeling program, generally including but not limited to QuickDraw 3D Metafile (.3dmf), 3D Studio Max Model (.max, .3ds), AC3D Model (.ac), Anim8or Model (.an8), Art of Illusion Model (.aoi), Blitz3D Model (.b3d), Blender (.blend), Cinema 4D (.c4d), Cal3D (.cal3d), CAG—Linear Reference System, Compressed File Library (.cfl), Caligari Object (.cob), OpenC™ (.ctm), COLLADA (.dae), Torque Game Engine (.dts), Electric Image (.fac), Autodesk FBX (.fbx), BRL-CAD geometry (.g), Ghoul Mesh (.glm), Lightwave Object (lwo), Lightwave Scene (.1ws), Luxology Modo (software) file (.lxo), Autodesk Maya ASCII File (.ma), Autodesk Maya Binary File (.mb), Quake 2 model format (.md2), Quake 3 model format (.md3), Blizzard Entertainment's own model format (.mdx), New York University (.m), Meshwork Model (.mesh), Misfit Model 3d (.mm3d), FreeMind mind map file (XML), Gamebryo NetImmerse File (.nif), OBJ (.obj), OFF Object file format (.off), Adobe PRC (embedded in PDF files), POV-Ray Document (.pov), RenderWare Object (.rwx), Nevercenter Silo Object (.sia), Nevercenter Silo Object (.sib), 3D Flash Gallery Model[1] (.u3d), Google Sketchup file (.skp), SolidWorks Assembly Document (.sldasm), SolidWorks Part Document (.sldprt), Valve's format. (.smd), Universal 3D file format (.u3d), Wings3D (.wings), DirectX 3D Model (.x), Extensible 3D (.x3d), or Zmodeler (.z3d).

From this point forward, the following words will describe a concealed hinge for a one piece eyewear and a method for making the same. These words are not a limitation on the scope of the present invention but are written to detail certain embodiments. After reading the detailed description, modifications will become apparent to those skilled in the art, and they are contemplated by this disclosure.

3D Modeling the One Piece Eyewear

A 3D modeling program provides a simple and intuitive platform to create and modify the hinges for the one piece eyewear. As such, the user of the present invention should be skilled in 3D modeling systems and techniques. Commercially available 3D programs have free-form surface manipulation capabilities, where 2D traces of parametric curves are made by free handing structures with non-uniform rational B-spline surfaces (NURBS).

An experienced user will understand how to manipulate control points and meshes that define a contoured surface by using B-spline curves. 3D programs include, but are not limited to, 3DMLW (3D Markup Language for Web), Dassault Systemes graphic representation, Virtual Architecture CAD, Ashlar-Vellum Argon—3D Modeling, ArtCAM model, BRL-CAD Geometry, Solidedge Assembly, Pro/ENGINEER Assembly, Data Design System DDS-CAD, CopyCAD Curves, CopyCAD Model, CopyCAD Session, CadStd, CATIA V5 Drawing document, CATIA V5 Part document, CATIA V5 Assembly document, CATIA V5 Manufacturing document, AutoCAD and Open Design Alliance applications, Solidedge Draft, MicroStation design file, Delcam Geometry, Delcam Machining Triangles, ASCII Drawing Interchange file format—AutoCAD, VariCAD drawing file, Wilcom—Wilcom ES Designer Embroidery, Agtek format, EXCELLON, FeatureCAM, FormZ, BRL-CAD, GERBER, T-FLEX CAD, GRAITEC, Auto CAD, Solidworks, Autodesk Inventor, Fusion 3D, Rhino 3D, Alias, Pro-Engineer Sketchup, and the like. Any generic program should be capable of sweeping, extruding, revolving, lofting, slicing, sculpting of a surface, or converting connected points forming 2D parametric contours and straight lines into any imaginable 3D shape.

Within a 3D modeling program, points and line segments in a Cartesian plane, e.g. an [x, y, z,] Cartesian system, are used as predetermined spatial instructions or can be free hand drawn to create virtually solid models of the one piece eyewear. The construct will have weight, density, and a center of gravity in either case. The one piece eyewear in its final form will be tangible eyewear that can accept fashionable or prescription lenses for someone to wear.

Most 3D modeling programs present a GUI to the user based as a 3D Cartesian system. The end result for a 3D model of the one piece eyewear is information being drawn and exported as a file that serves as spatial instructions for a 3D printer to layer the construct. Any 3D modeling program should be loaded onto a computer having at least a central processing unit, a main memory for storing programs or data, and a fixed or hard drive unit, which are all coupled by a data bus, or the program can be available over a Network, meaning the internet. The computer can take the form of a desktop, laptop, all-in-one, net-book, tablet, or mobile computer device.

The computer should have a basic operating system, such as MS Windows, Linux, Mac OS, or the like. The computer is capable of storage including but not limited to random access memory, read only memory, hard disks, floppy disks, compact disks, DVDs, flash drives, solid state disks, tape drives, or any other type of device or medium capable of storing information temporarily or permanently. Non-limiting examples of computer inputs and outputs may include, without limitation, a keyboard, a mouse, a trackball, a joystick, a touchpad, and/or a microphone, a CRT monitor, or an LED or LCD display panel.

The spirit of the present invention includes drawing a one piece eyewear having concealed hinges in a 3D modeling program, exporting the spatial instructions for the construct in a 3D printer file format, and layering the one piece eyewear with materials commonly used by 3D printers. The lens frame and temple bars can take various shapes, non-limiting examples shown in FIG. 2. They can either be free hand drawn or imported as ready to use computer files being spatial instructions within a 3D modeling program. However, the one piece eyewear obtains novelty when the hinge and its offsets, drawn free handed as piece meal parametric curves, are used to connect the lens frame to the temple bars within a 3D modeling program.

Figure 2:
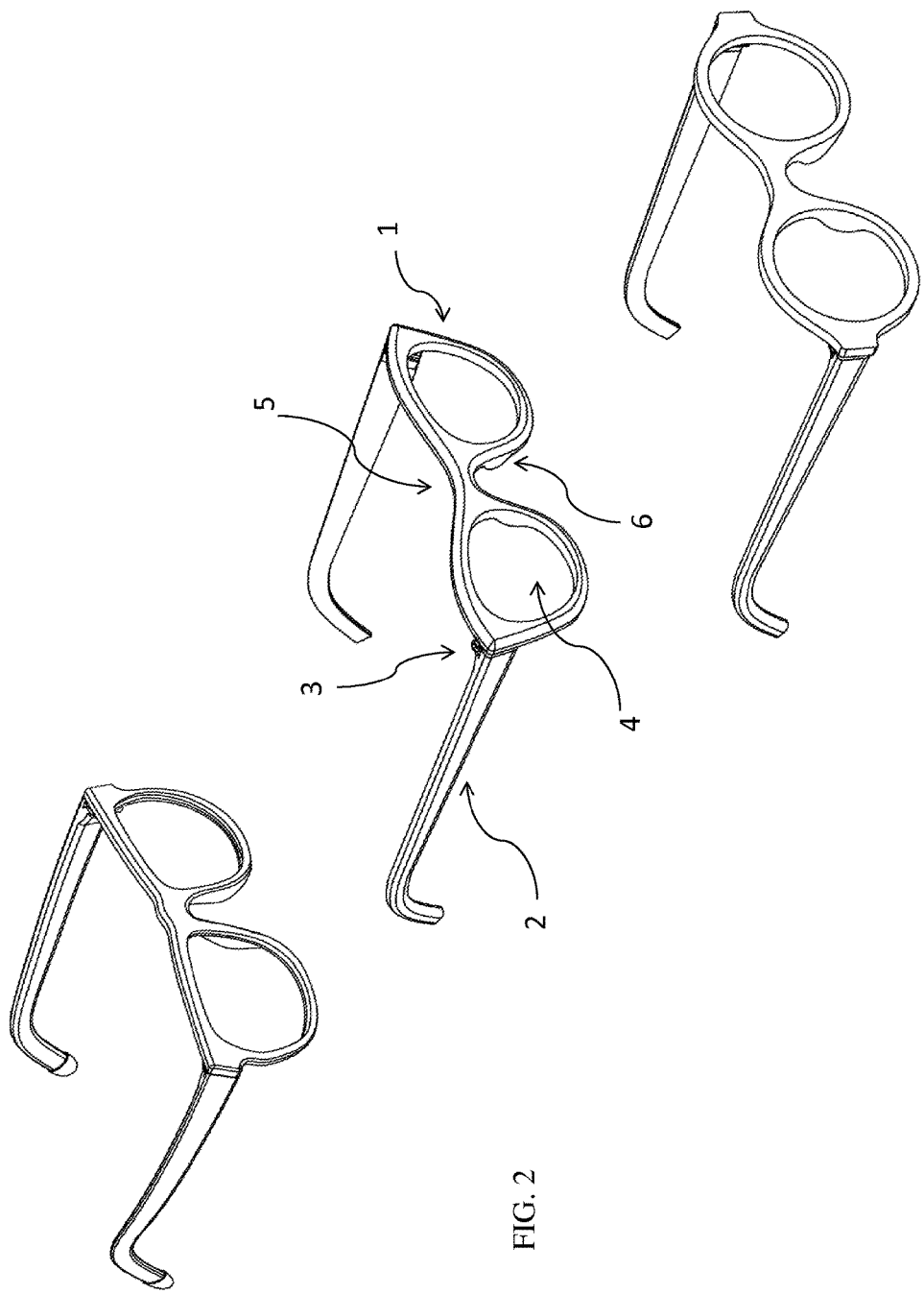
FIG. 2 depicts multiple eyewear designs made via 3D Printing, where each lens frame 1 design is attached to left and right temple bars 2 by the concealed hinge 3 of the present invention. These 3D images illustrate that the hinge's 3 contour, over all shape, and flexibility are not limited by any particular style of lens frame 1 initially drawn or uploaded by the user in a 2D Cartesian system, rendered into a 3D image, and where the resulting instructions are sent to a 3D printer for layering.

FIG. 2 shows the present invention including different styles of lens frames. Each lens frame 1 is connected to left and right temple bars 2 by the concealed hinge 3. The desired lens frame 1 of any size or shape has at least two eye lens portions 4, a bridge 5, possible nose pads 6, corners to accept the U-shaped hinges 3, and a possible brow bar (not shown). Note that the bridge 5 width, distance between the lenses 4, the diameter, height, and width of each lens and the length of the temple bars 2 will be design dependent. These 3D images illustrate that the hinge's contour, over all shape, and flexibility are not limited by any particularly styled lens frame 1 designed and selected or drawn by the user in a 2D or 3D Cartesian system, modeled into a 3D image, and where the resulting instructions are sent to a 3D printer for layering.

This list of eyewear designators is non-limiting and is not meant to be exhaustive, but it serves to illustrate that the design and functionality of the concealed hinge 3 is not limited by the shape of the lens frame 1 chosen or drawn by the user. The temple bars 2 may be styled in a classic shape so long as each temple bar is designed to overlap with one of the offsets to conceal the hinge from being clearly visible when the frame is worn.

Figure 3:
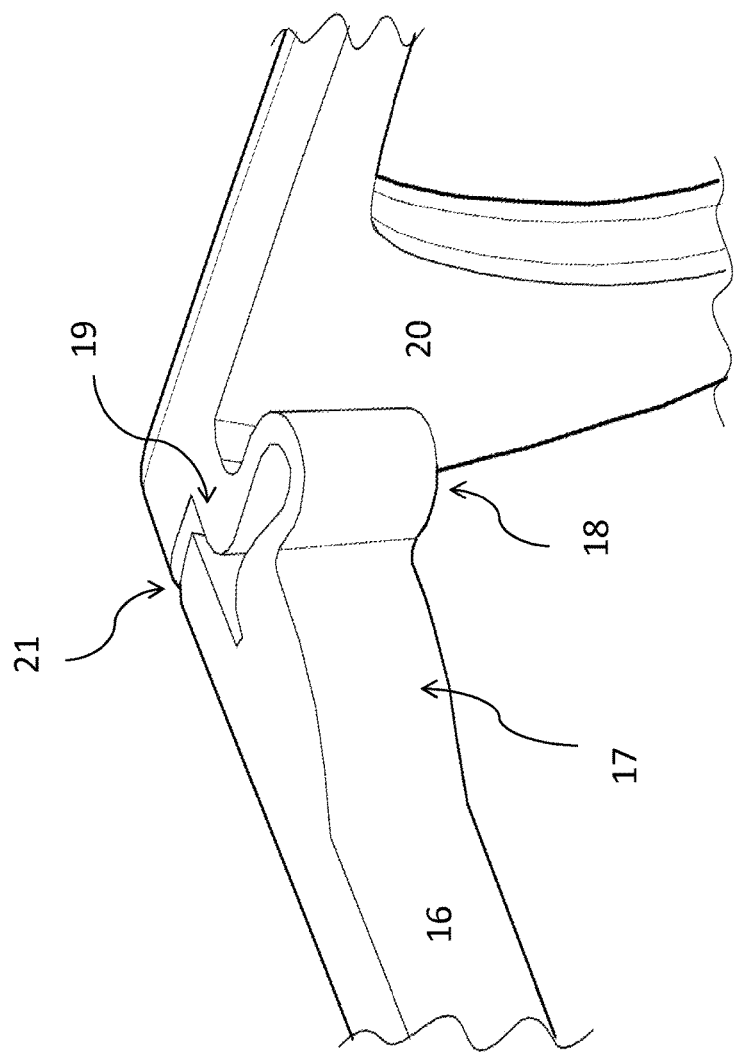
FIG. 3 is a 3D modeled lens frame 20, temple bar 16, flexible U-shaped hinge 18, and hinge offsets 17, 19. The parametric contour of the hinge 18 in 3D gives the user a more solid depiction of the physical dimensions of the concealed hinge 18 with a gap 21. When rendered in a computer program capable of exporting 3D printing instructions/file formats, this 3D image serves as spatial instructions for the 3D printer to layer and build the one piece eyewear.

FIG. 3 depicts a 3D sketch of how the concealed hinge 18 and its offsets 17, 19 should look when drawn to connect the upper portion of the lens frame 20 to a temple bar 16. The one piece eyewear shows a temple bar in the open/wearing position, where the upper portion of the lens frame 20, hinge 18, offsets 17, 19, the gap 21, and one temple bar 16 are shown. It is an embodiment of the present invention where the other half of the one piece eyewear is made in the same manner to create a continuous construct.

Figure 4:
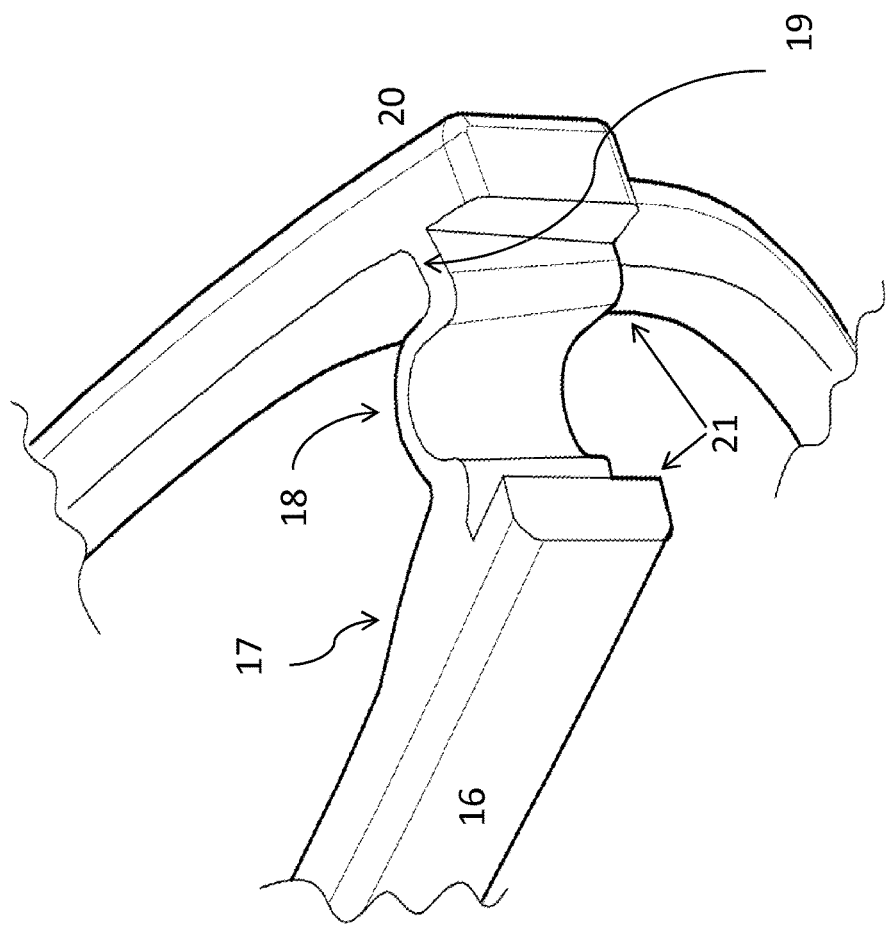
FIG. 4 is the 3D extrusion of the 2D sketch for the lens frame 20, temple bar 16, hinge 18, and hinge offsets 17, 19, where the temple bar 16 is at a nearly closed position with the hinge stretching away from the lens frame 20. This image indicates that the present invention 18 is contoured and flexible at its crest and partially flexible along the offsets 17, 19. Due to the flexibility of the hinge 18 and partial flexibility of the offsets 17, 19, the small gap 21 opens up to about a 90° angle allowing the temple bar 16 to rest parallel to the back portion of the lens frame 20.

FIG. 4 shows a 3D sketch of the one piece eyewear in a semi-closed position. This figure is meant to show that the parametric contours of the two complementary B-spline curves, along with the thinner amount of material deposited during the printing process, produce a hinge that is flexible enough to allow the temple bars to open and close.

The Concealed Hinge as a B-spline Parametric Curve

The hinge is defined by its parametric shape, contours, and flexibility. It mimics the rotational action of traditional hinges without rotating parts, and it can absorb mechanical forces that act on the frame. The hinge is flexible enough to open at an arc of at least 90°, and it is designed to open and close thousands of times without losing strength or flexibility. The hinge has these properties in large part due to it being a uniquely modified B-spline. These curves are formed by control points that map and blend connecting points, called knots, along curves in a Cartesian system.

B-splines are an easy way to make controlled design curves and can be initially detailed by the following equation:

$$C(u)=B_{0,1}(u)*P_0+B_{1,1}(u)*P_1+B_{2,1}(u)*P_2+B_{3,1}(u)*P_3.$$

(u) represents the input for the parametric equation that will define the Curve, C, which may be plotted across x(u), y(u), and z(u). B represents B-spline basis functions that are defined by a given knot vector, being a point or range of points that smoothes a curve between control points within the Cartesian coordinate (equations not shown). P represents the control points selected by the user when forming a parametric curve in either two or three dimensions.

The above equation can be compacted to:

$$C(u)=\Sigma_{i=0}^{n} B_{i,p}(u)P_i.$$

The eyewear's use of B-spline parametric curves to create the hinge as a surface may be analyzed via the equation:

$$C(u)=\Sigma_{i=0}^{3}\Sigma_{j=0}^{3}B_{i,p}(u)B_{j,q}(v)P_i+\Sigma_{i=0}^{3}\Sigma_{j=0}^{3}B_{i,p}(u)B_{j,q}(v)P_i.$$

The above math, in its complex form, is typically hidden from the user in any commercial interface for a 3D modeling program, but, if need be and allowed by the 3D modeling program, can be used with a series of inputs for P, (u), or B to model the concealed hinge.

It is an embodiment of the invention where the user free hand draws two complementing B-spline curves to form the hinge and its offsets. The hinge includes a top B-spline curve and a bottom B-spline curve that connects the lens frame to the temple bars. These two curves are nearly mirror images at the changing contour points along each curve. The relationship between the two B-spline curves, along with the thinner amount of material used during printing, creates a parabolic cross section between the two irregular offsets that is the most flexible portion of the hinge.

Defining the Hinge's Contours by Physical Dimensions

To being, the user either uploads instructions for or draws the lens frame and temple bars of their choice in the modeling program. The user has a great deal of artistic freedom when using control points to draw the hinge and its offsets in either 2D or 3D within a modeling program. The hinge is created with two B-spline curves, where the hinge's contours are better described by their physical dimensions and distances relative to the lens frame and temple bars.

It is an embodiment of the invention where the user free hand draws two complementing B-spline curves to form the hinge and its offsets. The hinge includes a top B-spline curve and a bottom B-spline curve that connects the lens frame to the temple bars. These two curves are nearly mirror images at the changing contour points and slopes along each curve from end to end.

Figure 5:
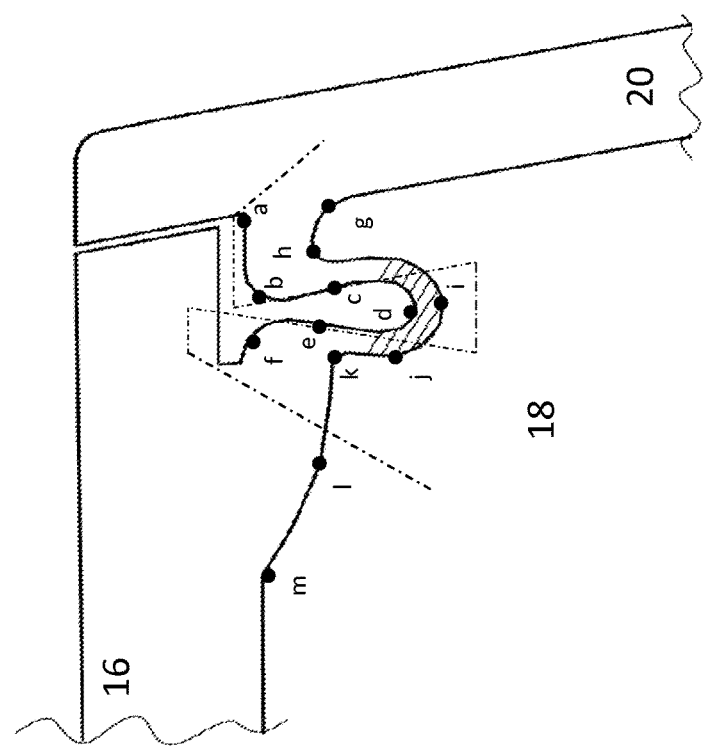
FIG. 5 shows a top down view of the hinge 18, lens frame 20, and temple bar 16 in 2D. The temple bar 16 is in the open wearing position. The two curves connect the lens frame 20 to the temple bar 16, where dots a-f detail the top curve and dots g-m detail the bottom curve. The control points are represented by an angular dash dot line that controls the blending of knots along the hinge's top curve.

FIG. 5 shows a top down view of the hinge 18, lens frame 20, and temple bar 16 in 2D. The temple bar 16 is in the open wearing position. The two curves connect the lens frame 20 to the temple bar 16, where dots a-f detail the top curve and dots g-m detail the bottom curve. The control points are represented by an angular dash dot line that controls the blending of knots along the hinge's top curve. Knowing the relative distances of dots b-f to dot a and dots i-m to dot g on the back of the lens frame 20 will give the user a more confident way to draw the hinge 18 in free-form.

Dots a and g are located on the top back surface of the lens frame 20 and are the initial points of contact for the hinge 18 to the upper corner of the lens frame 20. Dots a and g serve as starting points for the top and bottom B-spline curves respectively. Dot a rests from about 2.5 mm to about 5.0 mm from the outermost edge of the lens frame 20 and from about 1.0 mm to about 3.0 mm from dot g on the same 20.

The top B-spline curve starts as a line segment at dot a and then begins to curve at dot b. The distance between dot a and b is from about 2.0 mm to about 4.0 mm, where the contour slopes downward at a nearly 45° angle. The sloping segment between dots b and c continues on into the next contour at dot d.

The most flexible portion of the hinge is centered about the contour that is drawn at dot d. Dot c is 3.5 mm to 4.0 mm from dot a, and dot d is about 6.0 mm from dot a. The contour at dot d has a parabolic shape when the temple bar is in the wearing position and has a radius of curvature from about 32.5° to about 63.0°.

The contour at dot d continues on through a rising slope that crosses through dot e, which is from about 7.0 mm to about 9.0 mm from dot a. The segment about dot e curves slightly upward from about 15° to about 25° and continues through to endpoint f. The endpoint for the hinge's 18 top B-spline curve is dot f, located at an overlap on the back surface of the temple bar 16. Dot f is 8.5 mm to about 10.0 mm from dot a and is the endpoint for the top B-spline curve.

Staying with FIG. 5, the bottom B-spline curve is drawn as a near mirrored complement to the top B-spline composite. The hinge's bottom curve includes various contours and slopes from end to end. Dot g rests on the back surface of the lens frame and is parallel from dot a. The bottom B-spline curve starts as a line segment at dot g and then curves at dot h. The distance between dot g and h is from about 1.5 mm to about 3.5 mm, where the contour slopes downward at a nearly 45° angle. This sloping segment continues from dot h on to a contour at dot i, which is from about 4.5 mm to about 6.0 mm from dot g.

To give some context on the thickness of the hinge, the contour surfaces of dot i and dot d, located on the top B-spline composite, are separated by a distance of about 0.7 mm to about 1.25 mm. The contour at dot i has a parabolic shape, similar to an irregular teardrop shape, when the temple bar is in the wearing position and has a radius of curvature from about 32.5° to about 63.0°.

The contour at dot i continues on through a rising slope that crosses through dot j, which is from about 7.0 mm to about 9.0 mm from dot g. The segment about dot j curves slightly upward from about 10° to about 20° and continues through to dot k, being from about 9.0 mm to about 11.0 mm from dot g. As the line segment goes through dot k it curves down from about 5° to about 12° into dot 1. Dot 1 is about 10.5 mm to 12.0 mm from dot g and is about 2.5 mm to about 3.2 mm from inner most surface of the temple bar 16 to which it overlaps. The line segment through dot 1 continues to gently curve downward from about 5° to about 15° and terminates at dot m at the temple bar overlap, being about 12.0 mm to about 13.5 mm from dot g.

A small gap 21 is added where the outer portion of the temple bar 16 meets the lens frame 20. The gap 21 is from about 0.0001 mm to about 1.0 mm when the temple bar 16 is in the wearing position. Also note that the hinge's 18 lens frame offset serves as a support and stop for the temple bar 16 when the eyewear is being worn.

Figure 6:
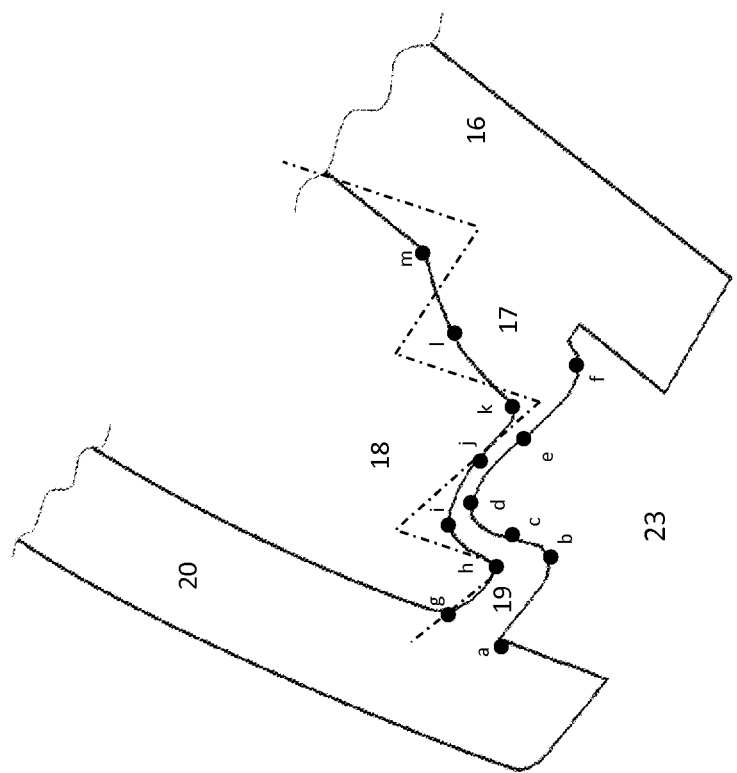
FIG. 6 is a top down view of the hinge 18, lens frame 20, and temple bar 16 in 2D. The temple bar 16 is in the closed position. To keep continuity with FIG. 5, dots a-f are associated with the top B-spline curve and dots g-m make the bottom B-spline composite. The control points are represented by an angular dash dot line that controls the blending of knots along the hinge's bottom curve.

FIG. 6 is a top down view of the hinge 18, lens frame 20, and temple bar 16 in 2D. The temple bar 16 is in the closed position. To keep continuity with FIG. 5, dots a-f are associated with the top B-spline curve and dots g-m make the bottom B-spline composite. The control points are represented by an angular dash dot line that controls the blending of knots along the hinge's bottom curve. The hinge 18 is an area of weakness that allows the temple bar 16 to pivot inwards at about 90° relative to the open/wearing position. This flexibility is due to a thinner amount of layering material deposited during the printing process in and about the hinge 18 area.

The U-shape allows the eyewear to concentrate movement mostly at the hinge's 18 parabolic cross section. In the closed position, the gap 21 places the back surface of the lens frame 20 from about 7.0 mm to 9.0 mm from the outer edge of the temple bar 16. Dots b and f are at a distance of about 5.0 mm to about 7.0 mm when the temple bar 16 is closed. Dots f and m are at a distance of about 8.0 mm to about 10.0 mm from each other.

3D Printing the One Piece Eyewear

Figure 7:
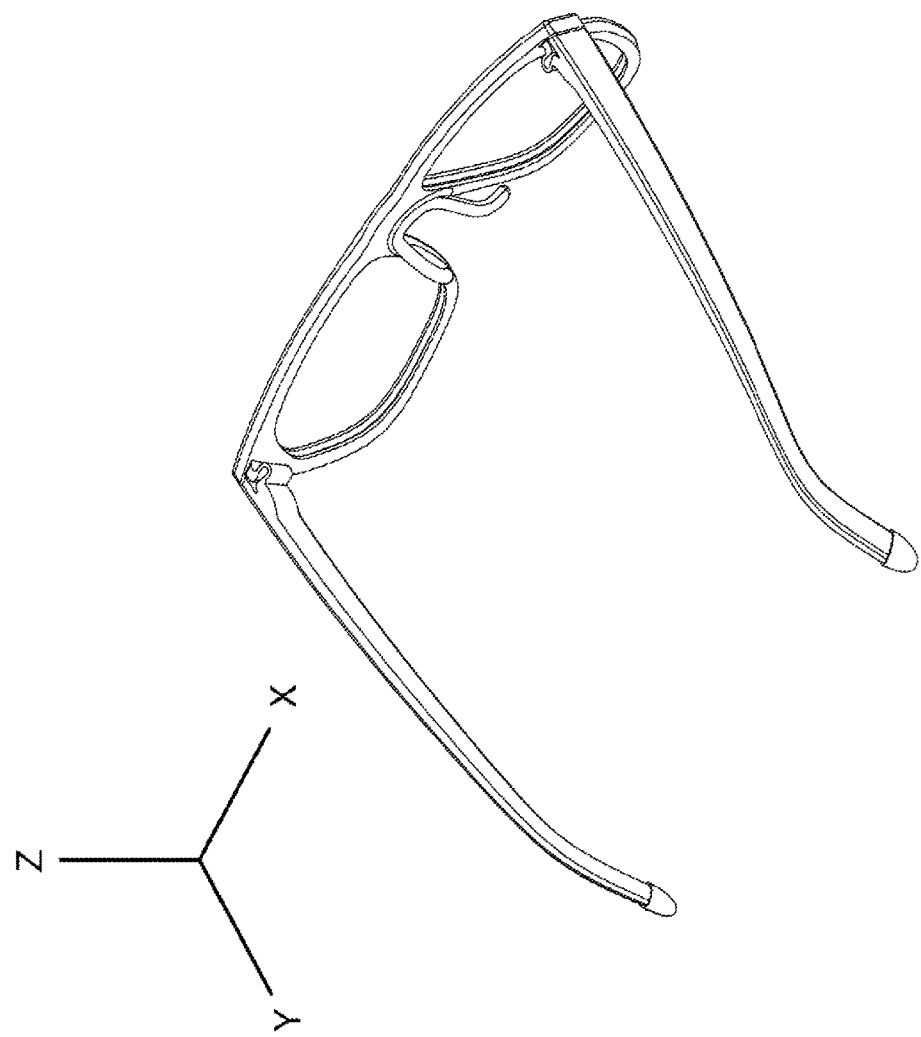
FIG. 7 details one export orientation for the eyewear. Having the eyewear is this orientation ensures that layering is done from the bottom surface up.

The user exports digital instructions for the eyewear from the 3D modeling program to a computer located at a 3D printer. The digital instructions are spatial points that create a 3D template for layering the construct in the real world. FIG. 7 details one export orientation for the eyewear. Having the eyewear is this orientation ensures that layering is done from the bottom surface up. 3D printer file formats include but are not limited to .stl (STereoLithography), .obj, PLY, or the like.

The one piece eyewear may be layered via 3D printing methods known within the arts including but not limited to extrusion deposition, binding of granular materials, lamination, or photo polymerixation. The plastic material can be virtually any thermoplastic elastomer with sufficient fatigue resistance.

For example, the plastic material can be a thermoplastic polyurethane, styrene block-copolymers, thermoplastic silicone elastomer, aliphatic or semi-aromatic polyamides, and thermoplastic vulcanisate. More specific materials may include without limitation, acrylonitile butadiene styrene, polylactic acid, polyvinyl alcohol, polycarbonate, polylactic acid, or any combinations thereof. Alternatively, a more rigid plastic material such as polyethylene, polypropylene or polyamide may be used. The one piece eyewear may also be 3D printed using metals such as gold, steel, stainless steel, titanium, silver, or any combinations thereof. Secondary treatment for the frame may be needed to ensure a smooth surface after printing, non-limiting examples being treating the surfaces of the one piece eyewear with polish or a buffer in addition to paint or lacquer.

The material used for the eyewear during 3D printing can vary and is dependent on the point of weakness, i.e. the amount of flex or bend the hinge can achieve without causing damage to the material and breaking the point of weakness. The lens frame's weight depends on the type of materials they are produced in. A non-limiting example being a nylon frame printed through SLS techniques, which can be as light as 10 g in weight with the 'U' area of the hinge taking up as little as about 0.1 g to about 0.05 g for both hinges. The approximate ratio can be applied to other frame shapes and other material options. The hinges are about 0.1% to about 3% of the overall weight of the one piece eyewear.

Note that the general size of the hinge can vary dependent on the stiffness of the material it's printed in and being attached to a lens frame with a heavier and thicker temple bar. A non-limiting example being, a more flexible material, like a rubber, is naturally more elastic. The hinge thickness may need to be larger to avoid having the temple bars being too elastic about its parabolic cross section. Heavier lens frames and thicker temple bars may need a thicker hinge area to help hold the additional weight. Irrespective of the printing material for the one piece eyewear, it is an embodiment of the present invention where digital printing of the one piece eyewear includes using SLS, Stereoliography, FMD, or CLIP 3D printers. U.S. Pat. No. 5,518,680 to Cima, L. et al. discloses various 3D printing techniques, and US Patent Application No. 2015/0097315 filed by DeSimone, J. M. et al. discloses a 3D printing technique called Continuous Liquid Interface Production (CLIP), both of which are incorporated herein by reference.

Selective Laser Sintering (SLS®) includes a computer associated with a 3D printer scanning a file format exported from a 3D modeling program that contains the spatial points for the one piece eyewear. After scanning cross sections from the exported file, a $CO_2$ high power laser fuses small plastic particles, metal, or ceramic powders into a 3D construct on the surface of a powder bed.

When each cross-section is scanned, the material is successively layered by lowering the powder bed by one layer thickness, one on top of the other, until the one piece eyewear is completed. SLS® printers may include without limitation a 3D systems sPro Series and the Pro X series made by 3D Systems. Laser sintering can produce parts from a relatively wide range of commercially available powder materials, including polymers, ceramics, and metals (such as steel, titanium, alloys and composites).

Fused Deposition Modeling (FDM)™ includes a computer associated with a 3D printer that slices a file format exported from a 3D modeling program. The resulting sliced program creates a tool path for heated nozzles. The data is then sent to another part of the printer, which then manufactures the one piece eyewear layer by layer on a build platform. Thin spools of a filament are used to create each cross section of the construct.

Dual heated nozzles extrude materials and precisely lay them down in successive layers, where the nozzles move as an x-y plotter and the platform moves, or drops, with a z motion according to the tool path of the one piece eyewear. A suitable system is available from Stratasys, Incorporated of Minneapolis, Minn. FDM printers may include without limitation The Stratasys Fortus 900, The Stratasys Polyjet machines, The Stratasys Connex machines, The Ultimaker machines, The Makerbots Rep 2, and 5th Generation machines.

Stereolithography is another 3D printing method contemplated by the current invention. This method of 3D printing is also known as SLA, SL, optical fabrication, photo-solidification, solid free-form fabrication, or solid imaging and Resin printing. Stereolithography includes a 3D printer for making solid objects by successively "printing" thin layers of an ultraviolet curable material one on top of the other. Machines made by the likes of 3D systems or Stratasys's range of polyjet machines are examples of current forms of SLA technology.

Continuous Liquid Interface Production, or CLIP printing, are 3D printers created by Carbon 3D and is a form of additive manufacturing that uses photo polymerization to create smooth-sided solid objects of a wide variety of shapes. CLIP objects have smooth sides as compared to current commercial 3D printers, whose sides are typically rough to the touch. Some resins produce objects that are rubbery and flexible that could not be produced with earlier 3D printers.

Regardless of the type of 3D printer used to make the one piece eyewear, the digital instructions for printing the eyewear are formed in and exported from a 3D modeling program. As such, the user of the present invention should be skilled in 3D modeling systems and techniques. Commercially available 3D modeling programs have free-form surface manipulation capabilities, where 2D traces of parametric curves are made by free handing structures with non-uniform rational B-Spline (NURBS) surfaces. An experienced user will understand how to manipulate control points and meshes that define a contoured surface through the use of B-Splines (NURBS) or Bezier Curves.

It is an embodiment of the invention wherein a user logs onto a website or an in store computer based kiosk having a 3D modeling platform with a wide variety of selections of one-piece eyewear frames having concealed hinges. The user selects from a cavalcade of standard eye-wear shapes (all with the unique one part concealed hinge design), then adjusts the lens frame and temple bars in terms of size and shape within predetermined parameters.

This selection will be a starting point from which the user can make real-time adjustments to the lens frame and temple bars. The user will be able to adjust the frame from predetermined variables, freely moving the frame shape about within the defined parameters. The user is adjusting the lens frame and temple bars for an optimal fit but also to style the shape to suit your face and personal visual preference.

Upon adjusting to the preferred shape, the consumer could go on to choose material and color before going on to choose the lens type, be it prescription lenses, sunglass lenses, no lenses, or the option of adding their own lenses once they've tried on the frame. The user then selects a color, a full decal style, and finally purchases the one piece eyewear having concealed hinges. The instructions for the eyewear sculpted by the user in either a kiosk or across the internet via their personal computer are sent to a 3D printer to create the user's custom one piece eyewear with concealed hinges, where the finished eyewear being delivered to the user's address or may be picked up from a store.

The foregoing words describe one embodiment for making a one piece eyewear having concealed hinges. However, these words are not a limitation on the scope of the present invention, but are written to detail certain embodiments thereof. It should be understood that changes may be made by one of ordinary skill in the art to the invention without departing from the scope of the invention, thus, the scope of the present invention is defined solely by the following claims.

What is claimed is:

1. A one piece eyewear, which comprises:
   a lens frame, the lens frame having a first lateral side, a second lateral side disposed opposite the first lateral side, a front surface and a back surface disposed opposite the front surface;
   a first temple bar, the first temple bar having a first axial end, a second axial end situated opposite the first axial end, an inner surface and an outer surface situated opposite the inner surface, the first temple bar being situated in proximity to the first lateral side of the lens frame;
   a second temple bar, the second temple bar having a first axial end, a second axial end situated opposite the first axial end, an inner surface and an outer surface situated opposite the inner surface, the second temple bar being situated in proximity to the second lateral side of the lens frame;
   a first concealed hinge, the first concealed hinge being interposed between and directly connected to the first temple bar and the lens frame, the first concealed hinge having a first end, a second end situated opposite the first end and a resiliently deformable portion therebetween, the first end of the first concealed hinge being directly connected to the back surface of the lens frame and the second end of the first concealed hinge being directly connected to the inner surface of the first temple bar; and
   a second concealed hinge, the second concealed hinge being interposed between and directly connected to the second temple bar and the lens frame, the second concealed hinge having a first end, a second end situated opposite the first end and a resiliently deformable portion therebetween, the first end of the second concealed hinge being directly connected to the back surface of the lens frame and the second end of the second concealed hinge being directly connected to the inner surface of the second temple bar;
   wherein the lens frame, the first temple bar, the second temple bar, the first concealed hinge and the second concealed hinge are integrally formed as a single unitary piece;

wherein the lens frame generally resides in a plane;
wherein each of the first temple bar and the second temple bar is hinged inwardly and outwardly pivotable relative to the plane in which the lens frame generally resides between a first position and a second position, wherein in the first position the first temple bar and the second temple bar are generally perpendicular to the plane in which the lens frame resides, wherein in the second position the first temple bar and the second temple bar are closest to the lens frame, and wherein the second position corresponds to a closed position and the first position corresponds to an open wearing position;
wherein the first temple bar includes a first extended portion situated at the first axial end thereof;
wherein the second temple bar includes a second extended portion situated at the first axial end thereof;
wherein the first end of the first concealed hinge and the back surface of the lens frame define a first recess in proximity to the first lateral side of the lens frame into which the first extended portion of the first temple bar is at least partially received when the first temple bar is situated in the first position, the first extended portion, when at least partially received by the first recess, conceals from view from the outer surface of the first temple bar the first concealed hinge when the first temple bar is situated in the first position;
wherein the first end of the second concealed hinge and the back surface of the lens frame define a second recess in proximity to the second lateral side of the lens frame into which the second extended portion of the second temple bar is at least partially received when the second temple bar is situated in the first position, the second extended portion, when at least partially received by the second recess, conceals from view from the outer surface of the second temple bar the second concealed hinge when the second temple bar is situated in the first position; and
wherein the resiliently deformable portion of each of the first concealed hinge and the second concealed hinge is resiliently deformed so that it is capable of multiple pivots without degradation when the eyewear is in at least one of the first position and the second position.

2. The one piece eyewear as defined by claim 1, wherein the lens frame, the first temple bar, the second temple bar, the first concealed hinge and the second concealed hinge are modeled in a 3D modeling program as a single construct.

3. The one piece eyewear as defined by claim 1, which further comprises:
at least one lens, the at least one lens being situated on the lens frame, the at least one lens being at least one of a prescription lens, a non-prescription lens, a fashionable lens and a sun filtering lens.

4. The one piece eyewear as defined by claim 1, wherein the lens frame, the first temple bar, the second temple bar, the first concealed hinge and the second concealed hinge are formed of a material that comprises at least one of acrylonitrile butadiene styrene, polylactic acid, polyvinyl alcohol, polycarbonate, polylactic acid, thermoplastic polyurethane, styrene block-copolymers, thermoplastic silicone elastomer, aliphatic polyamides, semi-aromatic polyamides, thermoplastic vulcanisate, gold, steel, stainless steel, titanium, silver, polyethylene, polypropylene and polyamide.

5. The one piece eyewear as defined by claim 1, wherein the one piece eyewear is formed by 3D printing.

6. The one piece eyewear as defined by claim 1, wherein each of the first concealed hinge and the second concealed hinge is formed as a generally U-shaped member that includes a first side portion, a second side portion situated opposite the first side portion and a center portion interposed between the first side portion and the second side portion.

7. The one piece eyewear as defined by claim 6, wherein the U-shaped member has an outer surface and an inner surface situated opposite the outer surface, wherein the outer surface has a B-spline curvature and the inner surface has a B-spline curvature, wherein the B-spline curvature of the outer surface is complementary to the B-spline curvature of the inner surface.

8. The one piece eyewear as defined by claim 6, wherein the center portion of the U-shaped member has a first flexibility, the first side portion of the U-shaped member has a second flexibility and the second side portion of the U-shaped member has a third flexibility, wherein the first flexibility is greater than each of the second flexibility and the third flexibility.

9. The one piece eyewear as defined by claim 1, wherein each of the first temple bar and the second temple bar is freely hingedly pivotable between the first position and the second position.

10. The one piece eyewear as defined by claim 1, wherein in the first position, each of the first concealed hinge and the second concealed hinge is stretched, and wherein in the second position, each of the first concealed hinge and the second concealed hinge is compressed.

11. A one piece eyewear, which comprises:
a lens frame, the lens frame having a first lateral side, a second lateral side disposed opposite the first lateral side, a front surface and a back surface disposed opposite the front surface;
a first temple bar, the first temple bar having a first axial end, a second axial end situated opposite the first axial end, an inner surface and an outer surface situated opposite the inner surface, a second temple bar, the second temple bar having a first axial end, a second axial end situated opposite the first axial end, an inner surface and an outer surface situated opposite the inner surface, the first temple bar and the second temple bar being extendable generally perpendicularly outwardly from the lens frame, the first temple bar being situated in proximity to the first lateral side of the lens frame and the second temple bar being situated in proximity to the second lateral side of the lens frame; and
a first single concealed hinge and a second single concealed hinge, the first single concealed hinge being interposed between and directly connected to the first temple bar and the lens frame and the second single concealed hinge being interposed between and directly connected to the second temple bar and the lens frame;
wherein the first temple bar includes a first extended portion situated at the first axial end thereof;
wherein the second temple bar includes a second extended portion situated at the first axial end thereof;
wherein the first single concealed hinge and the back surface of the lens frame together define a first recess into which the first extended portion of the first temple bar is at least partially received when the first temple bar is extended outwardly from the lens frame, the first extended portion, when at least partially received by the first recess, conceals from view from the outer surface of the first temple bar the first single concealed hinge when the first temple bar is extended outwardly from the lens frame;
wherein the second single concealed hinge and the back surface of the lens frame together define a second recess into which the second extended portion of the second temple bar is at least partially received when the second temple bar is extended outwardly from the lens frame, the second extended portion, when at least partially received by the second recess, conceals from view from the outer surface of the second temple bar the second single concealed hinge when the second temple bar is extended outwardly from the lens frame; and wherein the lens frame, the first temple bar, the second temple bar, the first single concealed hinge and the second single concealed hinge are integrally formed as a single unitary piece.

12. The one piece eyewear as defined by claim 11, wherein the lens frame, the first temple bar, the second temple bar, the first single concealed hinge and the second single concealed hinge are modeled in a 3D modeling program as a single construct.

13. The one piece eyewear as defined by claim 11, which further comprises:

at least one lens, the at least one lens being situated on the lens frame, the at least one lens being at least one of a prescription lens, a non-prescription lens, a fashionable lens and a sun filtering lens.

14. The one piece eyewear as defined by claim 11, wherein each of the first single concealed hinge and the second single concealed hinge is formed as a generally U-shaped member that includes a first side portion, a second side portion situated opposite the first side portion and a center portion interposed between the first side portion and the second side portion.

15. The one piece eyewear as defined by claim 14, wherein the U-shaped member has an outer surface and an inner surface situated opposite the outer surface, wherein the outer surface has a B-spline curvature and the inner surface has a B-spline curvature, wherein the B-spline curvature of the outer surface is complementary to the B-spline curvature of the inner surface.

* * * * *